US008146106B2

(12) United States Patent
Kim et al.

(10) Patent No.: US 8,146,106 B2
(45) Date of Patent: Mar. 27, 2012

(54) ON-DEMAND EMULATION VIA USER-LEVEL EXCEPTION HANDLING

(75) Inventors: Ho-Seop Kim, Austin, TX (US); Mauricio Breternitz, Jr., Austin, TX (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1032 days.

(21) Appl. No.: 11/968,055

(22) Filed: Dec. 31, 2007

(65) Prior Publication Data

US 2009/0172713 A1    Jul. 2, 2009

(51) Int. Cl.
G06F 9/44 (2006.01)
G06F 9/45 (2006.01)
G06F 9/455 (2006.01)

(52) U.S. Cl. ............. 719/318; 703/26; 703/27; 717/136

(58) Field of Classification Search .................... 703/26, 703/27; 717/136; 719/318
See application file for complete search history.

(56) References Cited

U.S. PATENT DOCUMENTS

| | | | | |
|---|---|---|---|---|
| 5,432,795 A * | 7/1995 | Robinson | | 717/125 |
| 6,314,560 B1 * | 11/2001 | Dunn et al. | | 717/153 |
| 6,496,922 B1 * | 12/2002 | Borrill | | 712/209 |
| 6,625,725 B1 | 9/2003 | Wu et al. | | |
| 6,959,435 B2 | 10/2005 | Ju et al. | | |
| 6,964,043 B2 | 11/2005 | Wu et al. | | |
| 7,496,495 B2 * | 2/2009 | Solomon et al. | | 703/26 |
| 7,685,579 B2 * | 3/2010 | Knowles | | 717/140 |
| 2005/0015754 A1 * | 1/2005 | Werner et al. | | 717/136 |
| 2005/0149915 A1 | 7/2005 | Wu et al. | | |
| 2005/0240896 A1 | 10/2005 | Wu et al. | | |
| 2007/0079304 A1 | 4/2007 | Zheng et al. | | |
| 2008/0126764 A1 | 5/2008 | Wu et al. | | |

OTHER PUBLICATIONS

Adams, Keith et al., A Comparison of Software and Hardware Techniques for X86 Virtualization, ASPLOS-2006; Oct. 21-25, 2006; San Jose, CA; copyright 2006 ACM; 12 pages.
Barham, Paul et al., Xen and the Art of Visualization, ACM Symposium on Operating System Principles; Bolton Langin, NY, 2003; SOSP'03; Oct. 19-22, 2003; Copyright 2003 ACM; 14 pages.
Bruening, Derek L, Efficient, Transparent, and Comprehensive Runtime Code Manipulation, Ph.D. Dissertation, MIT, Sep. 2004; Copyright MIT 2004; 306 pages.
Hewlett-Packard Co., The Real Story about Sun's CoolThreads (aka Niagara), http://www.hp.com/cgi-bin/pf-new.cgi?in=http://h71028.www7.hp.com/ERC/cache/280124—retrieved from WWW on Mar. 6, 2008; 3 pages.
Intel Corporation, Intel 64 and IA-32 Intel Architecture Software Developer's Manual, vol. 3A: System Programming Guide, Part 1, Order No. 253668-026US, Feb. 2008; 106 pages.

(Continued)

*Primary Examiner* — Charles E Anya
(74) *Attorney, Agent, or Firm* — Blakely, Sokoloff, Taylor & Zafman LLP (57) ABSTRACT

Methods and apparatuses enable on-demand instruction emulation via user-level exception handling. A non-supported instruction triggers an exception during runtime of a program. In response to the exception, a user-level or application-level exception handler is launched, instead of a kernel-level handler. Then the exception handler can execute at the application layer instead of the kernel level. The handler identifies the instruction and emulates the instruction, where emulation of the instruction is supported by the handler. Emulating the instructions enables the program to continue execution. Repeated instruction emulation is amortized via dynamic binary translation of hot code.

15 Claims, 5 Drawing Sheets

OTHER PUBLICATIONS

Intel Corporation, Intel 64 and IA-32 Intel Architecture Software Developer's Manual, vol. 3B: System Programming Guide, Part 2, Order Number: 253669-026US; Feb. 2008, 670 pages.

Smith, James E., et al., Virtual Machines Versatile Platforms and Systems and Processes, Morgan Kaufmann Publishers (an imprint of Elsevier) Copyright 2005 Elsevier Inc.; San Francisco, CA, USA, ISBN: 1-55860-910-5; Title pages, table of contents and pp. 27-68 and 114-127 (total of 60 pages).

* cited by examiner

ON-DEMAND EMULATION VIA USER-LEVEL EXCEPTION HANDLING

FIELD

Embodiments of the invention relate to instruction set backward compatibility via emulation, and more particularly to on-demand emulation via user-level exception handling to provide instruction set backward compatibility.

BACKGROUND

Many processors provide backward compatibility with legacy software. This is especially true of processors used as the central processing unit of computing devices (e.g., a processor belonging to the family of INTEL ARCHITECTURE (IA) processors). Backward compatibility may be provided via hardware support, or via instruction emulation. Hardware support has been accomplished via full hardware implementation of all instructions of a legacy instruction set architecture (ISA). Hardware support might make sense when the performance overhead of instruction emulation is relatively high compared with the performance of hardware support, and when the hardware platform uses a relatively small number of cores (e.g., 1 or 2).

However, as the number of cores in a processor increases, the investment in terms of semiconductor real estate can be high compared to the performance savings gained by hardware support for legacy ISA instructions. An example is the implementation of a full fledged x87 floating point instruction unit in an INTEL processor (of Intel Corporation of Santa Clara, Calif.) that uses a higher performance floating point instructions in SSE or SSE2. Implementing a full x87 unit requires a significant amount of die space for mostly a "just-in-case" backward compatibility scenario.

As the number of cores increases, designers that decide to implement hardware support for legacy instructions must decide whether to keep seldom-used hardware resources in each and every processor, or determine to share legacy hardware resources. Such a dilemma has risks—keeping hardware resources on every core generally appears to be wasteful, but a potential "glass jaw" scenario could result from having the cores share resource. That is, if a significant workload requiring legacy instruction support simultaneously loaded multiple cores, the need for shared hardware resources could result in a significant performance hit.

Software-based emulation of instructions can be implemented on each core rather than sharing or having hardware support units. Two well-known emulation techniques are interpretation and dynamic binary translation (DBT). Both techniques rely on "scan-before-execution" so they can find unsupported instructions before they are executed. If such instructions are found, the emulation system either changes the program control flow to an existing, appropriate emulation routine (interpretation) or dynamically generates an equivalent code and transfers program control to the newly created code (dynamic binary translation). However, interpretation has a relatively high performance overhead (several orders of magnitude) as compared to native implementation of an instruction, which has limited its practical application. DBT provides much less overall performance overhead (tens to hundreds of percentage slow down) as compared to interpretation when translated codes are executed frequently (e.g., "hot codes"), which effectively amortizes the translation overhead. However, the less frequently executed "cold codes" still pose a serious challenge for the DBT technique to reach the near-native performance level.

Another software-based emulation technique is an on-demand, illegal opcode exception, which can reduce the frequency of interpretation/translation dramatically. The on-demand technique is an exception-based on-demand interpretation, which configures an exception handler to redirect the exception of interest, on demand, to appropriate interpretation code. However, the exception technique suffers from the very high latency of the kernel-based exception handling mechanism, which requires the saving and restoring of state of the executing program to implement the exception handler. That is, the exception handling has required multiple processor mode changes and use of the kernel-level exception handler, which are generally too slow for frequent use.

Thus, hardware-based mechanisms suffer from cost and performance tradeoffs, and software-based mechanisms are not very effective in performance as compared to native implementation by the hardware.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, emulation is performed on-demand, in contrast to traditional interpretation or dynamic binary translation (DBT). Additionally, the on-demand emulation is performed from a user-level exception, rather than at a kernel level, further reducing execution time of emulated instructions. In one embodiment, a user-level handler implements DBT to provide on-demand DBT.

Exceptions are generally handled first by the operating system (OS) kernel. As used herein, exceptions refer to any instruction or even that interrupts the normal execution of instructions of a program. Normal execution of instructions is generally considered to be when the program counter retrieves the next-most instruction(s), and/or executes a jump or branch, including function calls, etc. Examples of exception may include errors or other asynchronous event triggers (e.g., user input, input/output (I/O) trigger, etc.). Typically when an exception condition is triggered, the processor executing the OS changes its operating mode to the most privileged (e.g., Ring 0 in INTEL ACHITECTURE (IA) processors), and switches to the kernel stack. As used herein, a trigger refers to any event or condition that causes occurrence of something else. The process of responding to an exception condition or event typically also saves some or all machine state information and transfers operational control from the program to the OS's vectored interrupt service routine (ISR), which exists at the kernel-level. The kernel-level ISR then performs the necessary kernel-level handling and the OS may handle the error itself or invoke an exception handler associated with the program, if any exists. The kernel-level exception handling leads to long latency, but is considered acceptable as long as the exceptions are infrequent.

As briefly suggested above, in certain system implementations, an exception handler associated with a program or an application may exist within the system. As used herein, a program refers to all or part of a standalone application. An exception handler refers to an interrupt service routine (ISR) or program or functionality called by an ISR. The exception handler may be implemented in software, as a routine or subroutine executed out of memory. The exception handler may also be implemented in hardware, such as by a special-purpose processor. An exception handler may exist at the kernel-level (system-level interrupts), controlled and executed by the OS in a privileged state of execution. As discussed herein, an exception handler could also exist at a user-level or application-level, controlled and executed within the same environment as other user programs. Thus, a simple distinction to note between a kernel-level handler and a user-level handler is the need (kernel-level), or lack of need (user-level) to change state to execute the handler. That is, when an exception is triggered during the execution of a program, triggering a kernel-level handler requires saving state of the program, and changing to an operating environment of the kernel. If instead a user-level exception handler is executed directly in response to an exception triggered during execution of the program, state need not be changed to handle the exception. Having the user-level exception handler execute directly in response to the exception is in contrast to having a kernel-level exception handler execute and then turn operational control over to a user-level exception handler. Such a process would still require a change of state. Eliminating the changes of state can improve the performance of exception handling.

As provided herein, a system allows for a user-level exception handler for on-demand emulation. An exception handler is associated with a particular program or application, and will be directly called when an exception occurs. The user-level handler can determine whether it is able to handle the exception, and if not, pass control to the kernel-level exception handler. The user-level exception concept has been used for collection of run-time performance, taking advantage of the asynchronous nature of the exception handler. As described herein, the user-level exception concept is extended to enable operation in response to other triggers, such as an undefined opcode exception.

In one embodiment, a program's runtime software transparently installs an emulator as part of the user-level exception handler for unimplemented ISA features. The user-level exception as mentioned here may or may not be specific to the program itself. The user-level exception could be shared among multiple programs/application. If the program installs its own exception handler, the program's runtime software may "wrap" the original handler with its own user-level exception handler to cause an exception to be first delivered to the runtime's user-level handler. Alternatively, the program's runtime software may wrap its exception handler within the original handler to make the emulator part of the exception handler. As used herein, "wrapping" software with other software refers to dynamically making one software routine a subroutine of another software routine—thus, one exception handler would become a part (a subroutine) of the other exception handler. Note that the emulator as part of a user-level exception handler makes the emulation on-demand, which means that emulation happens only if an exception corresponding to a sequence of replacement instruction(s) is encountered at run time. Also, as used herein, the "runtime" of a program refers to operational code loaded in memory that executes the main function of the program.

In one embodiment, the runtime software of the program refers to a dynamic binary translation (DBT) framework that is part of the program. The DBT framework may install the exception handler. In one embodiment, as described in more detail below, the user-level exception handler includes a DBT framework to enable DBT as part of the emulation of opcodes/instructions not supported by an underlying hardware platform (e.g., the ISA of the processor does not include the instruction).

In one embodiment, when an instruction exception is triggered, the user-level exception handler first determines whether the exception can be supported by the emulator that is part of the user-level handler. Following the example provided above, the exception handler may determine whether the instruction is an x87 instruction for which the emulator is designed to handle. If the exception cannot be supported by the particular emulator, another emulator may be triggered (e.g., another user-level exception handler may exist with a different emulation engine), and/or the handler may trigger the traditional exception by temporarily turning off the user-level exception handling and branch back to the given instruction. Branching back to the given instruction along with the temporary disabling of the user-level exception handling may trigger the kernel-level exception handler. The user-level exception handler can be later re-enabled by the user-level handler (e.g., in conjunction with delivering the exception to the application), or another user-level handler (e.g., a wrapper exception handler). Note that most applications at the time of this filing do not install such user-level exception handlers, which would result in a typical behavior for an illegal opcode exception being program termination.

As mentioned above, DBT may be combined with on-demand emulation via user-level exception handling. With on-demand emulation, the frequency of emulation may be significantly reduced, leading to near native performance of the full hardware implementation in many scenarios. However, the frequency of exceptions may be non-trivial in certain situations. Frequent exceptions can be handled by extending user-level exception handling with DBT. DBT techniques use the concept of "hot codes," or instructions/codes that frequently are called. Rather than emulating a hot exception code repeatedly, DBT allows for a single translation of the code and repeated use of the translation in execution. The translation can be passed directly to the runtime software of the program, to avoid even invoking an exception. Thus, frequently emulated code sequences can be translated using only the hardware-supported features and implemented in the program without generating exceptions. DBT includes counting, monitoring, or tracking the frequency of use of a particular code. When a code has been called a threshold number of times (e.g., more than 2 times), the code may be considered hot.

To integrate DBT into the on-demand emulation mechanism, the user-level exception handler maintains a set of frequency counters for instruction addresses that trigger exceptions. When a counter reaches a threshold, the DBT subsystem is executed to translate the triggering instruction and subsequent code. Typically there is spatial locality in programs so multiple exception-triggering instructions of the same nature are found and translated in the same region, which reduces the frequency of the exception.

Note that DBT may be used as a complementary technique to the user-level exception mechanisms, unlike traditional DBT approaches. Traditional DBT maintains full control of the entire program execution. In contrast, as provided herein, DBT maintains control until the program reaches the end of a translated code and then branches to the original code.

With the on-demand emulation framework as discussed above, which may further include a DBT framework, the emulation framework may do more than just provide backward compatibility. For example, Transactional Memory (TM) is currently an emerging technology that provides control mechanism for controlling access to shared memory. The control mechanism may be considered a concurrency control, as shared memory control is typically desired for concurrent or parallel/semi-parallel computing. TM provides an alternative to semaphore-based control or locking. There may be times when parallel programs compiled for TM need to call legacy library functions/methods. The legacy codes do not support the semantics of TM and in many cases are only available in binary form. Therefore, recompiling the legacy codes for TM may not be an option. Traditional solutions may include ending/starting a transaction every time before/after such calls to legacy library functions/methods. To avoid such early termination of transactions due to calls to the legacy code, in one embodiment, the call is wrapped with an emulation layer so that transaction semantics can be preserved across the call. Wrapping the call with an emulation layer refers to redirecting or intercepting the call to an exception mechanism that will perform the call, emulate the legacy instructions, and provide the results as though the legacy library had returned the result. Note that in this case the behavior of legacy software is changed by emulation. In contrast, in the backward compatibility scenarios discussed above, it is the behavior of the hardware externally visible to the application that is changed by the emulation.

In another example, virtualization can be extended to virtualize operating systems that are not modified to provide virtualization. Virtualization refers to the capability of creating multiple separate, protected computing environments in a single system. Traditionally virtualization has been implemented by a combination of software and hardware techniques. However, first-generation virtualization technologies suffer performance penalties when running guest operating systems at the user privilege level, mostly due to the long latency ring changes. Similar to the description above where an illegal opcode triggers a user-level exception handling to emulate the instruction with instructions supported by the hardware environment, events that need virtualization can trigger user-level exception handling to provide para-virtualization of the events without requiring changes to the operating system. The user-level exception handling can perform the functions that would otherwise be performed in a virtualized environment.

Table 1 below provides an overview of the expected performance of the on-demand, user-level exception emulation as described herein, as compared to previous software emulation techniques. As will be understood, the proposed on-demand interpretation based on a user-level exception, avoids the cold code scan overhead of a full interpretation and DBT. It also avoids the expensive kernel-level exception handling of the on-demand kernel-level exception technique.

TABLE 1

Comparison of emulation techniques

| Emulation technique | | Full Interpretation | Dynamic Binary Translation | On-Demand, Kernel-Level Exception | On-Demand, User-Level Exception | On-Demand, User-Level Exception with DBT |
|---|---|---|---|---|---|---|
| Identification overhead | | High: scan every instruction repetitively | High: scan all newly encountered program codes | Low: only on exception by unsupported code | Low: only on exception by unsupported code | Low: only on exception by unsupported code |
| Emulation overhead | High Freq | High: scan every instruction repetitively | Low: reuse translated block of code | High: interpretation plus kernel trip overhead | Medium: emulate every exception instruction | Low: reuse translated block of code |
| | Low Freq | High: scan every instruction repetitively | High: reuse not available | Medium: reduced overhead from fewer kernel trips | Low: no kernel trip overhead | Low: no kernel trip overhead |
| Overall Overhead | | Highest: interpret all instructions | High: translation | High: kernel trips | Low: interpret only as necessary, no kernel trips | Low: interpret only as necessary, reuse hot codes |

Figure 1:
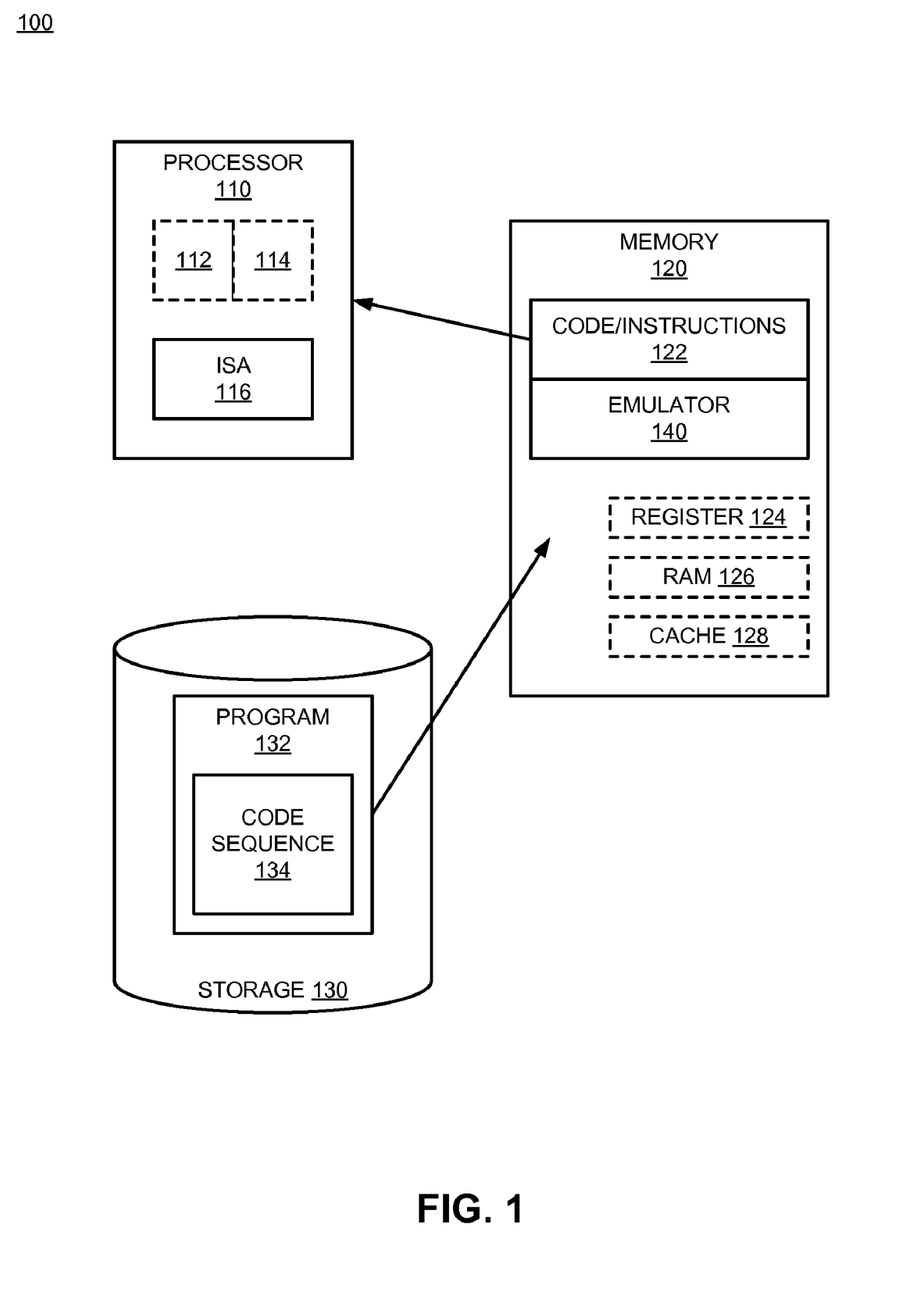
FIG. 1 is a block diagram of an embodiment of a system having an on-demand user-level emulator.

FIG. 1 is a block diagram of an embodiment of a system having an on-demand user-level emulator. System 100 illustrates components of a hardware computing platform having on-demand emulation with a user-level exception handler. System 100 includes processor 110, which may include one or more processors, and may be a multi-core processor, as illustrated by blocks 112 and 114. Each of 112 and 114 may be separate processing cores. The techniques described herein are applicable to any processor, and may particularly enhance performance for processors with 4 or more cores. Processor 110 is depicted with a representation of instruction set architecture (ISA) 116. ISA 116 is not necessarily a hardware component of processor 110, but does represent what instructions can be processed by processor 110. Each instruction has an identification field, which triggers the operation of different hardware units within the processor. Instructions that do not match the proper formatting of instructions for the processor can be considered unsupported instructions, which cannot produce the desired operation on the processor because of the hardware design of the processor. Thus, ISA 116 represents what instructions are supported and can provide a desired operation in processor 110. Instructions, for example legacy instructions, having a different format are executed in accordance with emulation as provided herein. Emulation includes selecting instructions from ISA 116 that provide the desired functionality of the unsupported instruction.

System 100 includes memory 120 and storage 130. Memory 120 and storage 130 provide storage of data and/or instructions, but there may be differences between the two. Storage 130 is non-volatile, referring to the fact that values within storage 130 will be maintained even when power to the device is interrupted. There is typically a significant difference between access time to storage 130 and the speed of processor 110. However, Flash may be used as storage, as well as memory because of its faster access time. Memory 120 may be volatile (it may lose its value when power is interrupted) or non-volatile (e.g., flash). The values of contents within storage 130 are generally expected to be the same for extended use of system 100 (hours, days, or more). The values of contents of memory 120 are generally expected to change more frequently (and can thus be considered temporary or volatile) as compared to storage 130 (the contents may last for microseconds up to hours), and there is generally no expectation of having valid contents after shut down or reboot events.

Memory 120 illustrates multiple different types of storage mechanisms, such as register 124, random access memory (RAM) 126, and/or cache 128. Register 124 refers to buffers within processor 110. RAM 126 may be any different type of RAM, or a combination of RAM technologies. Cache 128 is generally a random access memory located on the same package as processor 110, such as L1 and L2 cache on central processing unit (CPU) systems.

Storage 130 represents non-volatile storage (e.g., one or more hard drive resources). Program 132 represents some or all of a software application for execution. Program 132 includes code sequence 134, which will be understood for illustrative purposes to include one or more instructions (also referred to herein as opcodes) that are not supported within ISA 116. The arrow from program 132 illustrates the concept that program 132 is loaded into memory 120 for execution by processor 110. When program 132 is loaded into memory 120, code sequence 134 is also loaded into memory. Note that because code sequence 134 includes unsupported or illegal instructions, such instructions need to be emulated for processor 110 to execute the code sequence.

In one embodiment, memory 120 may include emulator 140 to provide emulation services as described herein. Emulator 140 provides on-demand, exception-based emulation services as described above. Memory 120 includes code/instructions 122, which are instructions to be executed on processor 110, which may include emulated instructions as generated by emulator 140. In one embodiment, emulator 140 is part of a user-level exception handler installed in the virtual memory space of program 132. In one embodiment, emulator 140 is implemented as part of an exception handler, which invokes emulation function operations from an emulator implemented in a hardware resource (e.g., a field programmable gate array (FPGA)—not explicitly shown).

Figure 2:
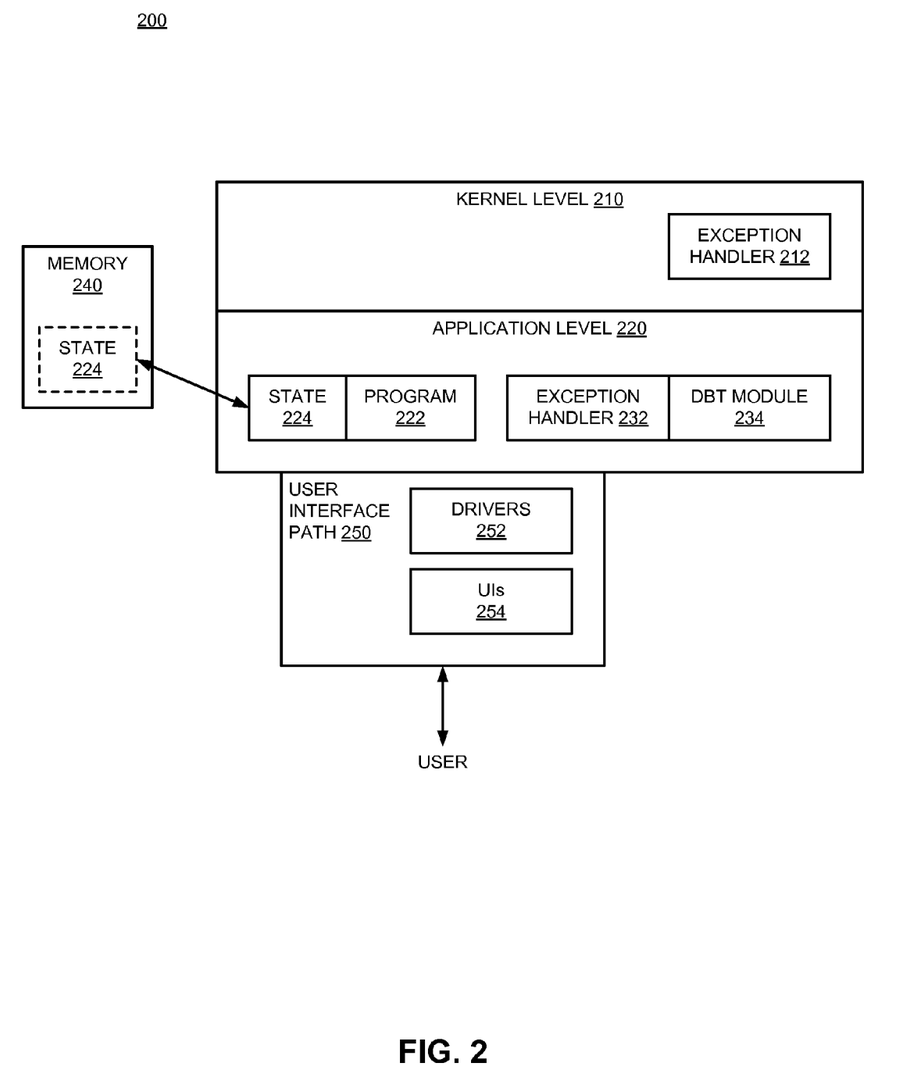
FIG. 2 is a block diagram of an embodiment of a system having an exception handler at an application layer that performs instruction emulation.

FIG. 2 is a block diagram of an embodiment of a system having an exception handler at an application layer that performs instruction emulation. System 200 represents a conceptual layout of a software environment of a computing device on which an exception handler as described herein could be implemented. The software environment includes an operating system that includes kernel level 210. Kernel level 210 refers to a privilege or access level of operating system kernels, which is not generally available to user applications. User applications and programs execute at application level 220, which may also be referred to as a user level. The user level provides the privilege and access levels available to user programs. In one embodiment, as discussed above, kernel level 210 includes exception handler 212. Kernel-level exception handler 212 provides one or more operations or routines to execute in response to an exception event or condition.

Applicant level 220 includes program 222 executing within the application level. Program 222 includes an execution state, as represented by state 224, which includes the current program counter within the program (when executing), and other configuration information. Traditional exception handling required state 224 to be saved to memory 240, and control directed to exception handler 212 of kernel level 210. In one embodiment, application level 220 includes exception handler 232, which provides user-level or application-level exception handling. Thus, state 224 need not be saved to memory 240 for handling an exception condition. In one embodiment, exception handler 232 includes or works in conjunction with DBT module 234 to provide on-demand, user-level DBT to emulate unsupported instructions of program 222.

System 200 also includes user interface path 250, for interacting with a user. User interface path 250 includes drivers 252 and user interfaces (UIs) 254 that enable input (e.g., via keypad/keyboard, pointing devices, etc.) from the user and output (e.g., display) to a user. Drivers 252 represent the software that enables the I/O (input/output) hardware devices.

Figure 3:
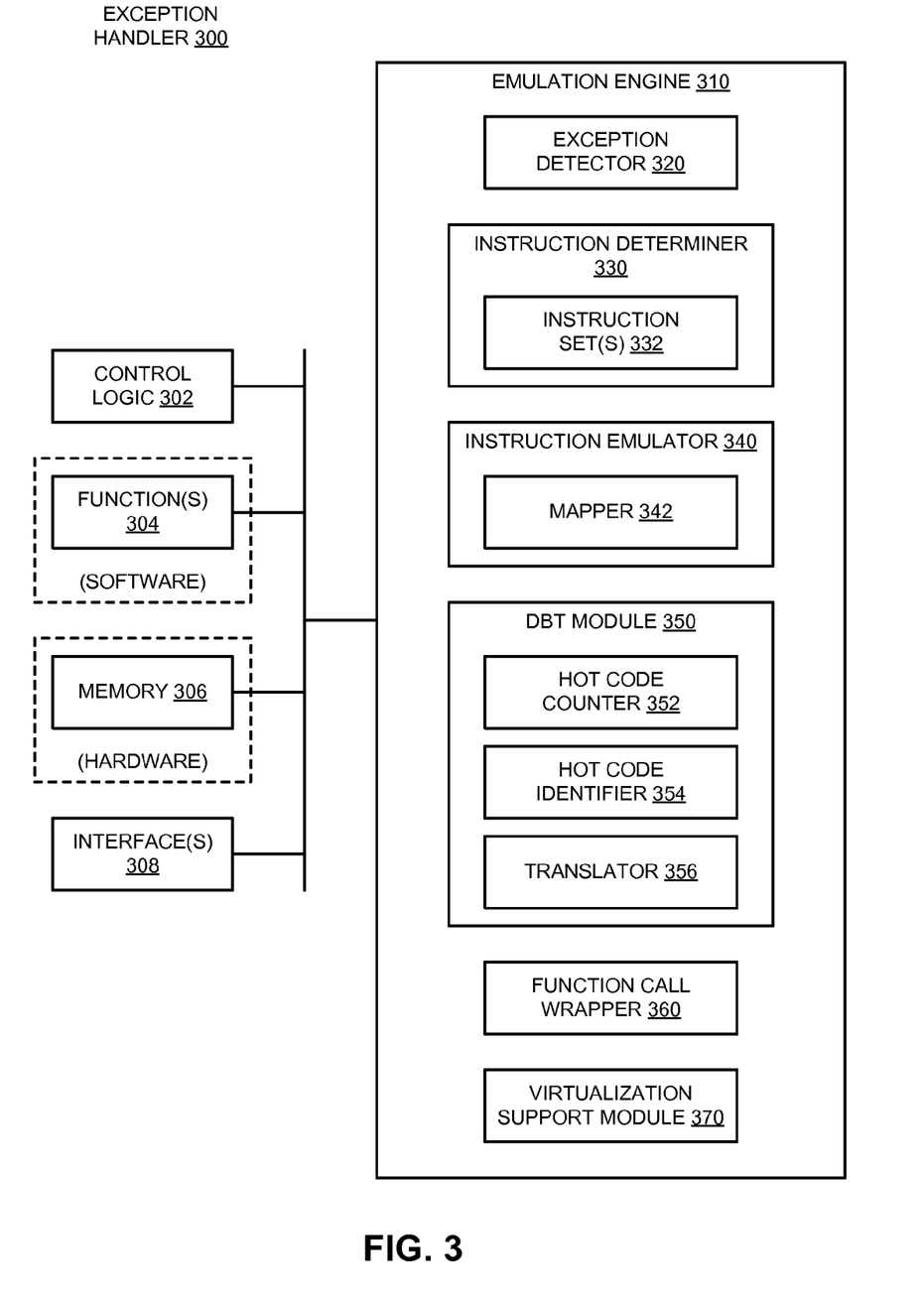
FIG. 3 is a block diagram of an embodiment of an exception handler.

FIG. 3 is a block diagram of an embodiment of an exception handler. Exception handler 300 includes control logic 302, which implements logical functional control to direct operation of exception handler 300, and/or hardware associated with directing operation of the exception handler. Logic may be hardware logic circuits and/or software routines. In one embodiment, the logic may be instructions executing on a processor of a computing device. Thus, in a software implementation, logic 302 provides instructions for the control of operation of a processor that executes exception handler 300. In a hardware implementation, logic 302 represents circuitry that provides functional control (e.g., outputs on a signal line). Logic 302 may also refer to the operating instructions and circuitry that control, for example, an embedded processor in an implementation with software and hardware combined.

In one embodiment, in an implementation that is partially or wholly software, exception handler 300 includes one or more functions 304, which represent code sequences or subroutines that are called as part of the exception handling routine. Functions 304 may be code executing on a common processor that executes exception handler 300.

In one embodiment, exception handler 300 includes memory 306 and/or access to memory resource 306 for storing data and/or instructions. In a hardware implementation, a hardware circuit that represents exception handler 300 may include a memory device. In a software implementation, memory 306 can be understood to refer to the ability of a software module to store data in memory and access registers for the execution of code. Thus, memory 306 may include memory local to exception handler 300, as well as, or alternatively, including memory of a storage server on which exception handler 300 resides.

Exception handler 300 also includes one or more interfaces 308, which represent access interfaces to/from (an input/output interface) exception handler 300 with regard to entities external to exception handler 300. In one embodiment, exception handler 300 is accessible as a component of a system that can be manipulated externally by a user through a user interface. Thus, interfaces 308 may include graphical user interfaces, keyboards, pointer devices, etc., in an implementation where exception handler 300 is accessible to human users. In an alternative embodiment, exception handler 300 executes "behind the scenes" to a human user, meaning the module performs its functions without being visible to the human user. However, even if not visible to a human user as a separate component, exception handler 300 can be accessible to external electronic components, or external software applications. Thus, in one embodiment, interfaces 308 include mechanisms through which external programs may access the module (e.g., drivers in a hardware implementation of exception handler 300, application program interfaces (APIs) in a software implementation, etc.).

Exception handler 300 also includes emulation engine 310, which represents one or more functional components that enable exception handler 300 to provide on-demand emulation as described herein. The functions or features of the components include, or are provided by, one or more of exception detector 320, instruction determiner 330, instruction emulator 340, DBT module 350, function call wrapper 360, and virtualization support module 370. Each module may further include other modules to provide specific functionality. As used herein, a module refers to a routine, a subsystem, etc., whether implemented in hardware, software, or some combination. One or more modules can be implemented as hardware while other(s) are implemented in software. Note that exception handler 300 may or may not be a single component. In one embodiment, exception handler 300 represents multiple modules or entities that work in conjunction.

Exception detector 320 enables emulation engine 310 to determine that an exception has occurred or will occur in response to an instruction, and respond to the exception. Exception detector 320 may be software or hardware logic that analyzes an instruction prior to execution by the processor. Alternatively, the exception mechanism may be provided via an error message or indication from the processor or the control logic as an invalid instruction results in an improper flow of execution (out of bounds read/write, etc.). Thus, exception detector 320 may determine that an error will occur from a particular instruction, or determines that an error has occurred. In one embodiment, the exception detector may simply be a call to the exception handling routines.

Instruction determiner 330 enables emulation engine 310 to identify or determine what invalid instruction was the cause of the exception detection. In one embodiment, the exception detector and instruction determiner are part of a single routine (e.g., the exception routine is called, with the instruction causing the exception indicated as a parameter of the call). Instruction determiner 330 may include a mechanism to read an instruction queue and/or the program counter to determine what instruction is unsupported. In one embodiment, instruction determiner 330 includes instruction set(s) 332, which may be one or more sets of instructions used to determine whether a given instruction is supported. Instruction set 332 may be a table or other data store that provides a list of supported instructions. If an instruction is not found on the list, it can be considered an unsupported instruction.

Instruction emulator 340 enables emulation engine 310 to emulate instructions unsupported by the underlying hardware platform into instructions supported by the hardware platform. Instruction emulator 340 may include mapper 342, which represents a mapping mechanism to indicate what supported instructions will perform the operations of the unsupported instructions. Mapper 342 may be implemented, for example, as a lookup table, where the unsupported instructions can be keys into the table. The unsupported instructions or legacy codes can have an entry to indicate what instructions will replace the unsupported instruction.

DBT module 350 enables emulation engine 310 to perform emulation with dynamic binary translation. DBT module 350 includes several functional elements to perform DBT emulation. Examples of functional modules may include hot code counter 352, hot code identifier 354, and translator 356. Hot code counter 352 maintains a counter to track a number of times a particular code or legacy/unsupported instruction is encountered. In DBT, a code is not considered a hot code unless it is encountered a threshold number of times. Once hot code counter 352 reaches the threshold, the code is placed in a hot code list. Hot code identifier 354 can identify hot codes from the list and engage translator 356 to translate the hot code. Translator 356 may provide a translation or emulation for the code, which will then be cached and repeatedly used, simply by identifying the hot code, and without having to perform further processing on the code or instruction. In one embodiment, the translation is pushed back to the runtime of the program from where the instruction was generated, allowing the program to have the translation locally, which prevents an opcode exception from occurring.

Function call wrapper 360 enables emulation engine 310 to wrap a function call to a legacy library or method in an emulation layer. That is, additional code is added to the function call such that the call can be made and processed by the legacy library, which result is then interpreted or emulated by the additional code. In this way, the same emulation principle is applied to legacy function calls, and not simply to legacy instruction exceptions. The legacy function call can similarly initiate the exception handler, which then adds the translation code to the function call.

Virtualization support module 370 enables emulation engine 310 to provide virtualization functions from an exception handler in a system that does not support virtualization. When a function is requested that requires virtualization in a system that does not support virtualization, the function request triggers an exception, which is handled by exception handler 300. Emulation engine 310 emulates virtualization in such a system. Virtualization support module 370 represents one or more functional blocks that provide the requested virtualization functions within the user layer, and return the results to the program after execution of the handler. In this way, execution is provided in a pseudo-virtualized manner as the execution is performed in a protected environment of the exception handler, without generating a virtualized environment as would be normally performed in systems that support virtualization.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium may cause a machine to perform the functions or operations described, and includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Figure 4:
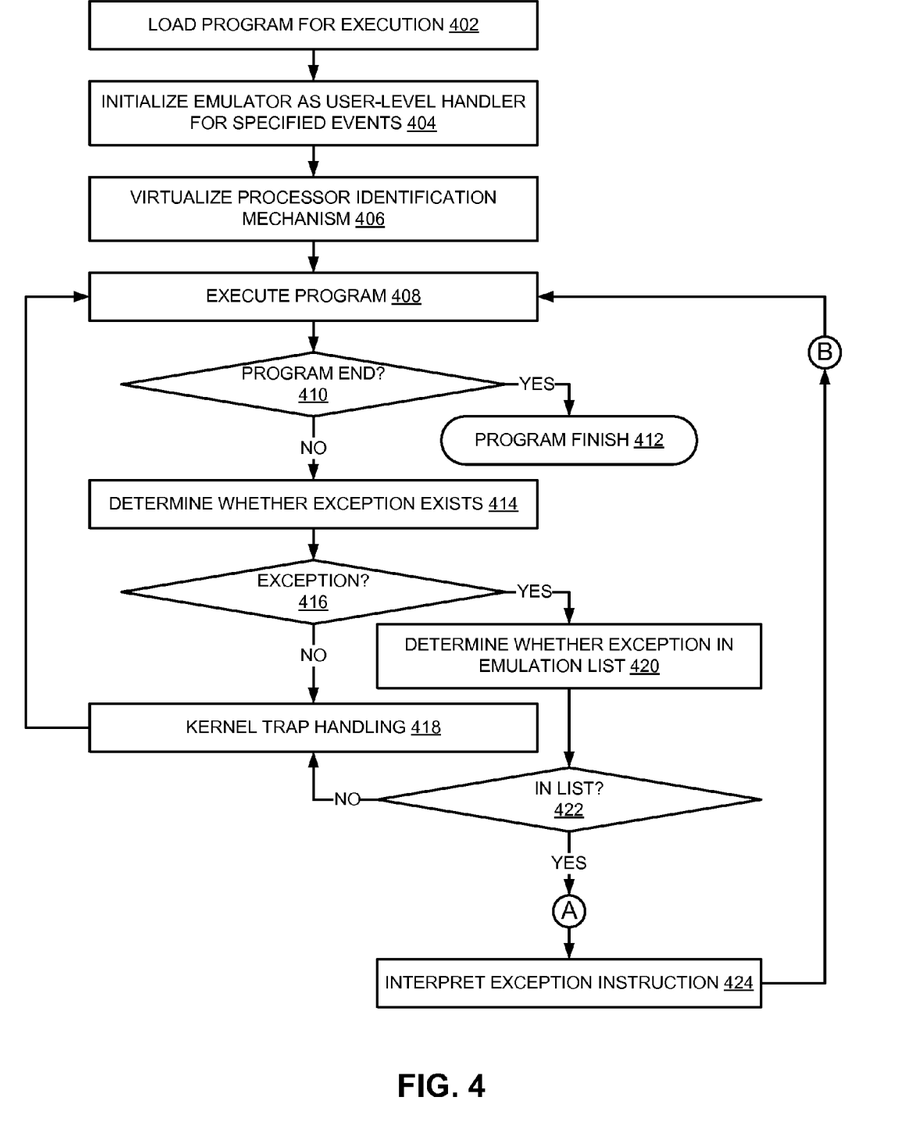
FIG. 4 is a flow diagram of an embodiment of a process for handling an instruction exception on-demand via user-level emulation.

FIG. 4 is a flow diagram of an embodiment of a process for handling an instruction exception on-demand via user-level emulation. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

A program is loaded for execution, 402. The program can be any user-level software for execution on a hardware environment. The program would be loaded in any manner understood in the art. In one embodiment, the program has an associated emulator to allow backwards compatibility with newer hardware platforms that may not support all of the instructions/opcodes present in the program. Such an emulator can be custom designed for the program and the particular hardware environment. In one embodiment, certain generic emulators can be present in a system. The program may have a dedicated associated user-level exception handler, or alternatively, a more generic user-level exception handler can handle exceptions originating from the program. The emulator for the program is initialized within the user-level exception handler for certain specified events, 404. The specified events may include opcode exceptions, legacy function calls, virtualization, etc.

In one embodiment, a processor identification mechanism can optionally be virtualized (e.g., a CPUID), 406. The program is loaded and executed on the hardware platform, 408. During runtime/execution of the program, something interrupts execution of the program. The system determines if the program execution is ended, 410. If program execution ends, 410, the program is finished and ceases execution, 412. If the program is not ended, 410, the system can determine whether an exception exists in execution of the program, 414. If an exception does not exist, 416, there is a system error, and the system provides control to a kernel trap handling, 418. If there is an exception, 416, the exception handler is passed control, and the exception handler determines whether the exception is in an emulation list within the exception handler, 420.

If the exception is not in the list, and thus not supported by the emulator, 422, the user-level exception handler passes control to the kernel trap handling, 418. If the exception is supported by the exception handler, 422, the emulator interprets the exception instruction, and provides one or more instructions to execute the functionality on the hardware platform, 424. Normal execution of the program then resumes, 408. Points A and B on FIG. 4 illustrate alternative implementations as provided in FIG. 5, below.

Figure 5:
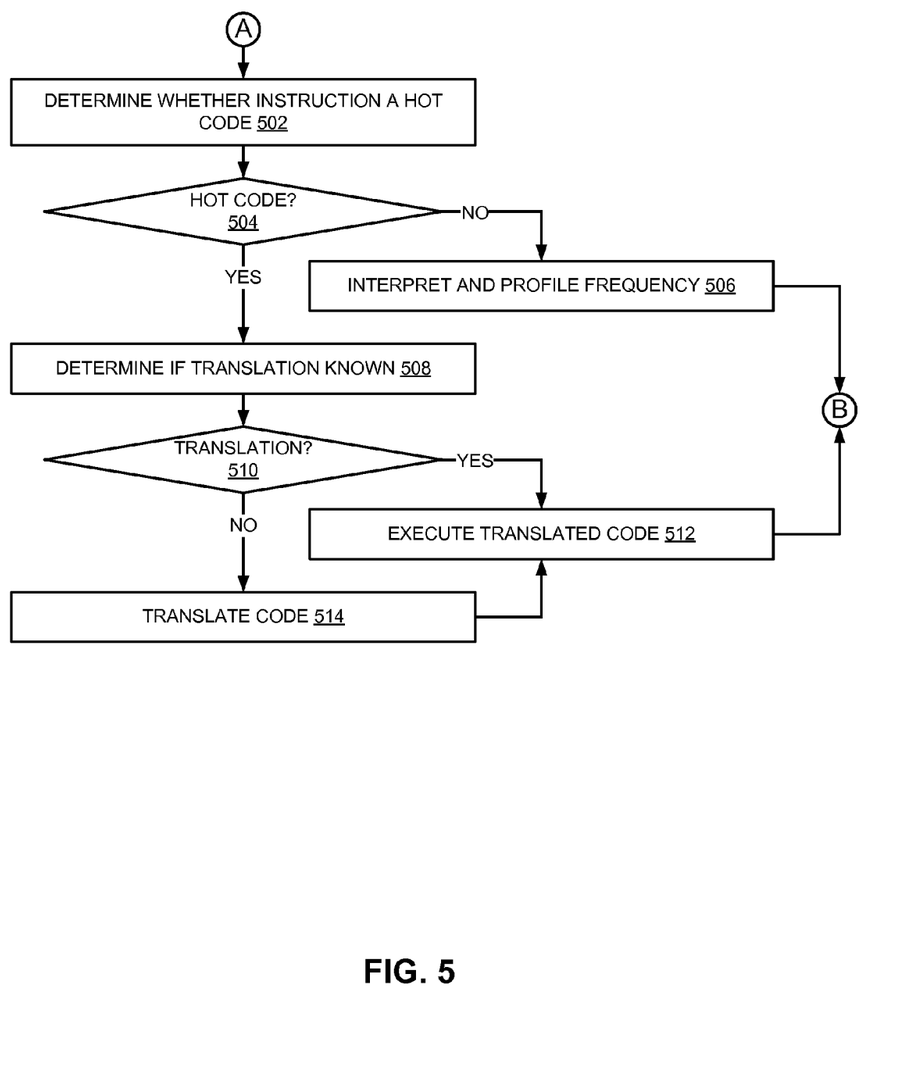
FIG. 5 is a flow diagram of an embodiment of a process for handling an instruction exception on-demand via user-level emulation with dynamic binary translation.

FIG. 5 is a flow diagram of an embodiment of a process for handling an instruction exception on-demand via user-level emulation with dynamic binary translation. In one embodiment, the emulator supports DBT. Thus, instead of simply emulating the instruction outright if the instruction is supported, as in block 424 of FIG. 4, the exception handler determines whether the instruction is a hot code, 502. A hot code is one that has been encountered a threshold number of times (e.g., it has triggered a threshold number of exceptions). If the instruction is not a hot code, 504, the emulator interprets the instruction and profiles its frequency, referring to maintaining a count of the number of times the instruction has been encountered, 506. Normal execution of the program then resumes, 408 of FIG. 4.

If the instruction is a hot code, 504, the exception handler determines if the translation is known, 508. If the translation is not known, 510, the emulator of the exception handler translates the code, 514. If the translation is known, 510, or after the translation is performed, 514, the emulator can execute or cause the program to execute the translated code, 512. Normal execution of the program then resumes, 408 of FIG. 4.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    detecting an exception during runtime of execution of a program, the exception triggered by an instruction not supported by a hardware platform of a computing system on which the program is executing, the instruction not having correct semantics to be executed by the hardware platform;
    executing a user-level exception handler instead of a kernel-level exception handler in response to detecting the exception including accessing an emulator as a subroutine of the user-level exception handler, wherein the user-level exception handler is implemented at an application layer, rather than within an operating system kernel;

determining that the exception is supported by the emulator that is part of the user-level handler;
identifying the instruction that triggered the exception in response to determining the exception can be supported by the emulator, wherein identifying the instruction that triggered the exception includes incrementing an exception trigger count for the instruction indicating a number of times the instruction has triggered the exception; and
if the exception trigger count reaches a threshold number, generating a dynamic binary translation;
passing the dynamic binary translation to a runtime of the program to enable the program to execute the dynamic binary translation without executing the instruction emulator of the user-level exception handler; and
transferring control from the dynamic binary translation to the program;
otherwise, emulating the instruction that triggered the exception from the user-level exception handler with instructions supported by the hardware platform to enable continued execution of the program.

2. The method of claim 1, wherein executing the user-level exception handler comprises:
executing a generic execution exception handler for the program; and
executing an instruction exception routine specific to handling instruction exceptions.

3. The method of claim 1, wherein executing the user-level exception handler comprises:
executing an instruction exception routine without saving an execution state of the program.

4. The method of claim 1, wherein identifying the instruction that triggered the exception comprises:
identifying the instruction that triggered the exception as one of a group of instructions supported by the user-level exception handler.

5. The method of claim 4, wherein identifying the instruction that triggered the exception comprises:
identifying the instruction that triggered the exception as belonging to a legacy instruction set architecture (ISA).

6. The method of claim 1, wherein detecting the exception comprises intercepting a call to a legacy library; and
wherein emulating the instruction further comprises calling the legacy library, receiving a result of the call from the legacy library, emulating the result from the legacy library, and returning the emulated result.

7. The method of claim 1, wherein identifying the instruction comprises determining that the instruction is part of a function that requires virtualization; and
wherein emulating the instruction further comprises performing a function that requires virtualization in the user-level exception handler.

8. An article of manufacture comprising a non-transitory machine readable storage medium having content stored thereon to provide instructions to cause a machine to perform operation including:
detecting an exception during runtime of execution of a program, the exception triggered by an instruction not supported by a hardware platform of a computing system on which the program is executing, the instruction not having correct semantics to be executed by the hardware platform;
executing a user-level exception handler instead of a kernel-level exception handler in response to detecting the exception including accessing an emulator as a subroutine of the user-level exception handler, wherein the user-level exception handler is implemented at an application layer, rather than within an operating system kernel;
determining that the exception is supported by the emulator that is part of the user-level handler;
identifying the instruction that triggered the exception in response to determining the exception can be supported by the emulator, wherein identifying the instruction that triggered the exception includes incrementing an exception trigger count for the instruction indicating a number of times the instruction has triggered the exception; and
if the exception trigger count reaches a threshold number, generating a dynamic binary translation;
passing the dynamic binary translation to a runtime of the program to enable the program to execute the dynamic binary translation without executing the instruction emulator of the user-level exception handler; and
transferring control from the dynamic binary translation to the program;
otherwise, emulating the instruction that triggered the exception from the user-level exception handler with instructions supported by the hardware platform to enable continued execution of the program.

9. The article of manufacture of claim 8, wherein the content to provide instructions for executing the user-level exception handler comprises content to provide instructions for
executing a generic execution exception handler for the program; and
executing an instruction exception routine specific to handling instruction exceptions.

10. The article of manufacture of claim 8, wherein the content to provide instructions for executing the user-level exception handler comprises content to provide instructions for
executing an instruction exception routine without saving an execution state of the program.

11. The article of manufacture of claim 8, wherein the content to provide instructions for identifying the instruction that triggered the exception comprises content to provide instructions for
identifying the instruction that triggered the exception as one of a group of instructions supported by the user-level exception handler.

12. The article of manufacture of claim 11, wherein the content to provide instructions for identifying the instruction that triggered the exception comprises content to provide instructions for
identifying the instruction that triggered the exception as belonging to a legacy instruction set architecture (ISA).

13. A system comprising:
a processor having an instruction set architecture (ISA) of supported instructions;
a memory having an instruction not supported by the ISA, the instruction not supported by the ISA triggering an exception during runtime of execution of a program, the instruction not having correct semantics to be executed by the hardware platform; and
a user-level exception handler to detect the exception and execute at an application layer of the system, rather than an operating system kernel layer, the user-level exception handler including an instruction emulator as a subroutine of the user-level exception handler having a mapper to emulate the instruction not supported by the ISA with instructions supported by the ISA the user-level exception handler to:

determine that the exception is supported by the emulator that is part of the user-level handler;
identify the instruction that triggered the exception, including incrementing an exception trigger count for the instruction indicating a number of times the instruction has triggered the exception: and
if the exception trigger count reaches a threshold number, the user-level exception handler to:
generate a dynamic binary translation;
pass the dynamic binary translation to a runtime of the program to enable the program to execute the dynamic binary translation without executing the instruction emulator of the user-level exception handler; and
transfer control from the dynamic binary translation to the program:
otherwise, emulate the instruction that triggered the exception from the user-level exception handler with instructions supported by the hardware platform to enable continued execution of the program.

14. The system of claim 13, the user-level exception handler further including:
a function call wrapper to identify a function call to a legacy library, and include emulation code with the function call to enable the function call results to be interpreted within the system.

15. The system of claim 13, the user-level exception handler further including:
a virtualization support module to provide virtualization functions at the application layer without establishing a virtualized environment.

* * * * *